US012430919B1

(12) United States Patent
Lin et al.

(10) Patent No.: US 12,430,919 B1
(45) Date of Patent: Sep. 30, 2025

(54) FILTERING FALSE POSITIVE COMPUTER-VISION-BASED OBJECT DETECTION EVENTS

(71) Applicant: Amazon Technologies, Inc., Seattle, WA (US)

(72) Inventors: Jhih-Yuan Lin, New Taipei (TW); Chih-Ting Liu, Taipei (TW); Meng-Jiun Chiou, Taipei (TW); Yu Luo, Santa Clara, CA (US); Meng-Ru Hsieh, Tainan (TW); Hua-Wei Chen, Taipei (TW); Shao-Hang Hsieh, Taoyuan (TW); Yi-An Chen, Yilan County (TW); Yang Liu, Saratoga, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 311 days.

(21) Appl. No.: 18/216,852

(22) Filed: Jun. 30, 2023

(51) Int. Cl.
*G06K 9/00* (2022.01)
*G06V 10/764* (2022.01)
(Continued)

(52) U.S. Cl.
CPC ............ *G06V 20/52* (2022.01); *G06V 10/764* (2022.01); *G06V 10/86* (2022.01)

(58) Field of Classification Search
CPC ...... G06V 10/82; G06V 10/25; G06V 10/764; G06V 10/774; G06V 20/52; G06V 10/454; G06V 20/58; G06V 40/161; G06V 40/172; G06V 20/40; G06V 2201/07; G06V 40/167; G06V 10/22; G06V 10/255; G06V 20/56; G06V 10/761; G06V 20/41; G06V 10/267; G06V 20/54; G06V 40/171; G06V 10/98; G06V 40/10; G06V 40/103; G06V 40/165; G06V 40/168; G06V 10/44; G06T 2207/20084; G06T 2207/20081; G06T 2207/10016; G06T 7/11; G06T 7/20; G06T 2210/12; G06T 2207/30232; G06T 7/246; G06T 7/73; G06T 7/97; G06T 2207/30241; G06T 2207/30252; G06T 7/12; G06T 7/248; G06T 7/55; G06T 7/60;
(Continued)

(56) References Cited

U.S. PATENT DOCUMENTS

2020/0089990 A1* 3/2020 Xu .................... G06F 18/2413
2021/0019666 A1* 1/2021 Tsukamoto ........ G06V 10/7747

OTHER PUBLICATIONS

Zhang et al. Focal and efficient IOU loss for accurate bounding box regression, Neurocomputing, Elsevier 2022 (Year: 2022).*

* cited by examiner

*Primary Examiner* — Alex Kok S Liew
*Assistant Examiner* — Alex Liew
(74) *Attorney, Agent, or Firm* — K&L Gates LLP

(57) ABSTRACT

Systems and techniques are described for suppressing false positive notifications for detected objects. In various examples, first bounding box data indicating a detection of a first class of object in a first frame of image data may be received from an object detector. Second bounding box data indicating a prior detection of the first class of object in a second frame of image data may be determined. A first value representing a similarity between the first bounding box data and the second bounding box data may be determined. A notification associated with the detection of the first class of object in the first frame of image data may be suppressed based at least in part on the first value.

24 Claims, 8 Drawing Sheets

(51) Int. Cl.
*G06V 10/86* (2022.01)
*G06V 20/52* (2022.01)

(58) Field of Classification Search
CPC .......... G06N 3/045; G06N 3/08; G06N 3/084;
G06N 20/00; G06N 3/04; G06N 3/0464;
G06N 3/09; G06N 20/20; G06N 3/048;
G06N 7/01; G06N 3/063; G06N 3/096
See application file for complete search history.

FILTERING FALSE POSITIVE COMPUTER-VISION-BASED OBJECT DETECTION EVENTS

BACKGROUND

Computer vision approaches (e.g. utilizing machine learning models) are commonly utilized for detecting objects in images from camera devices (e.g. security cameras or video doorbells). However, conventional systems are known to generate false positives at times, e.g. based on wind, etc. Sometimes, background objects present in a scene, or recurring in a scene, can trigger a large amount of false positive events.

DETAILED DESCRIPTION

Figure 1:
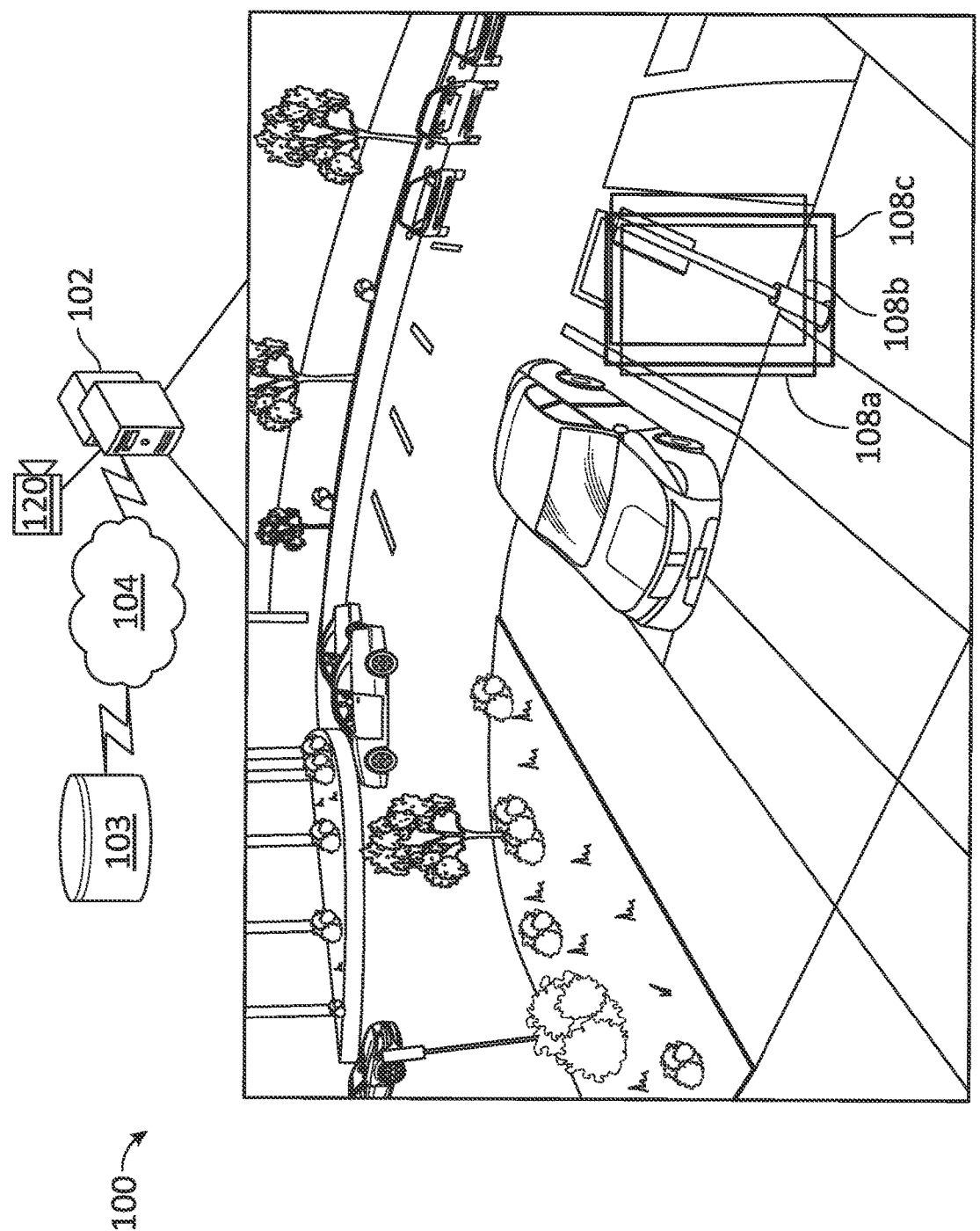
FIG. 1 is a diagram illustrating multiple object detection events, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices of a security system or other type of camera system. In various examples, camera devices may be battery-powered for ease of installation and to avoid unsightly power cords. In various other examples, camera devices may be powered through a wired interface (e.g., through "mains" power from a wall socket). In at least some examples, camera devices may include motion sensors to detect motion. In some examples, camera devices may be operated in a low power state (sometimes referred to as "sleep" mode) prior to detection of motion. In some examples, when motion is detected, the camera device may be controlled to begin capturing, encoding, and/or streaming video to one or more other devices (e.g., a video processing device) for storage, display, and/or processing. In some cases, once motion is detected, a machine learning-based object detector may be used to detect whether or not one or more objects-of-interest are detected in the captured images. Objects-of-interest may include persons, animals, vehicles, etc., depending on the desired implementation. In some cases, if no objects-of-interest are detected, notifications of the motion event and/or streaming of the video to one or more remote devices may be suppressed as the video may be deemed unlikely to be of interest to a user.

In some example systems, once motion is detected and/or an object-of-interest is detected in captured image/video data, the contents of a rolling buffer of captured image data may be encoded and sent/streamed to another device followed by a stream of video captured by the camera while motion is detected. Advantageously, waiting until motion is detected and/or an object-of-interest is detected prior to capturing and/or streaming image data and/or video data may prolong battery life (and minimize power consumption) by capturing, encoding, and/or streaming video only when the video is likely to depict events of interest. In many cases, and particularly in a surveillance context, video segments that do not depict movement or object-of-interest may not be of sufficient interest to a user of the camera system to warrant continuous video capture and/or streaming, particularly given that transmission of video data results in a quicker consumption of battery power and more frequent battery replacement. In addition, sending frequent notifications of motion events to a user may be annoying when the captured video does not represent objects/events of interest.

In various examples, when a camera device is triggered (e.g., via detection of motion and/or detection of a particular class of object) to capture video, a device that is registered in association with the camera (e.g., via a user account) may be sent a notification alerting the user of the detected motion event. For example, a notification may be sent to a companion application installed on the user's mobile phone (or other mobile device) and/or to a security terminal device. The user's mobile phone may have push notifications enabled for the companion application and the user may therefore receive a visual indicator, chime, and/or other notification to alert the user that video has been captured by the camera device. If desired, the user may select a graphical control to view the captured video in order to review the motion event. In many cases, such notifications are desirable as the user may be interested in seeing the event that resulted in the motion. However, in some cases, such alerts may represent events in which the user is uninterested. In some further cases, frequent notifications that represent a false detection of an object-of-interest (e.g., a person detector that repeatedly detects a tree as a person) may become annoying to the user and the user may want to silence such events for a certain amount of time.

In various examples described herein, object detections that are likely to be false positives (e.g., objects that are not of interest being detected as objects-of-interest) may be detected and filtered out. In this context, filtering out may mean that notifications related to such false-positive object detections may be suppressed and/or capturing and/or streaming of video related to such events may be suppressed.

In real-world environments, it is difficult for computer vision-based object detectors to have perfect accuracy and precision for detecting objects-of-interest due to changing lighting conditions and due to a large number of objects that the object detectors may not have been exposed to during training. Particularly, small background objects can pose challenges for object detectors and may trigger false positive object-of-interest detection events leading to unsatisfactory user experiences.

One technique that may be used for detecting false positive events is the comparison of a bounding box of a newly-detected object with a bounding box of a previously-detected object (e.g., a past false positive object detection) using an intersection-over-union metric. The intersection-over-union (IoU) metric is a ratio of the number of pixels of the intersection of the two bounding boxes to the number of pixels in the union of the two bounding boxes. Accordingly, bounding boxes which are the same size and shape and which are in the same location in the image frame have an IoU of 1.0, while bounding boxes that do not overlap whatsoever have an IoU of 0.0. If the IoU of a new detection is higher than a given threshold with respect to one or more past detections (determined to be false positives), there may be a high probability that the new detection is a false positive as well. While this approach typically works well for larger objects and/or foreground objects, this approach has limited efficacy with smaller and/or background objects. That is because even a slight shift in the center of two small bounding boxes (e.g., for smaller and/or background objects) may lead to a significant drop in IoU.

Described herein are approaches that may be used to overcome this issue of filtering out false detections for small, background objects. In various examples, dynamic and/or multi-tiered approaches may be used to compute the similarity between a bounding box for a new object detection and one or more historical bounding boxes (representing past object detections). In various examples, the confidence score of the object detector for the object detection (e.g., for the newly-detected bounding box) may be used during the similarity determination to determine whether to filter out the newly-detected bounding box as a false detection, as described in further detail below. Different similarity metrics for determining the similarity between a newly-detected bounding box and one or more historical bounding boxes may be used, in accordance with various techniques described herein. In some examples, a IoU metric with a dynamic threshold that varies according to the confidence score output by the object detector may be used. In some examples, a geometrical similarity may be used in addition to the dynamic IoU metric. The geometrical similarity may compare the center points of a newly-detected bounding box and one or more historical bounding boxes and may filter out geometrically similar bounding box detections. In some examples, embeddings (e.g., convolutional neural network embeddings) may be determined for the each bounding box (e.g., for the pixels bounded by each bounding box) and the distance (e.g., Euclidean distance, cosine distance, cosine similarity, etc.) may be determined between the embeddings to determine a visual similarity between the two bounding boxes. In some further cases, a weighted combination of geometric similarity and visual similarity may be computed between the newly-detected bounding box and one or more historical bounding boxes. In yet other examples, probability models (such as Gaussian distributions, linear distributions, etc.) may be used to compute the geometric similarity based on geometric characteristics (e.g., the distance between the bounding boxes' centers) of the newly-detected bounding box and one or more historical bounding boxes. In any event, upon computing a similarity score between a newly-detected bounding box and one or more historical bounding boxes, a determination may be made of whether to suppress notifications and/or streaming of video based on the newly-detected bounding box being highly similar to one or more historical bounding boxes.

False positive object detection results (such as false detection of background objects) can appear at any location in the field of view (FoV) of cameras. Moreover, the locations of bounding boxes caused by small object detections are usually shifted around within a region. As described above, traditional IoU filtering techniques may lead to poor performance of false-detection filtering events particularly when the bounding boxes are small and are shifting locations within a region. Accordingly, in various examples described herein, bounding box detections may be persisted in memory dynamically to keep track of false positive detection regions. For each newly-detected bounding box, the similarity between the newly-detected bounding box and bounding boxes stored in memory in false positive regions may be computed. The false positive region with the highest similarity to the newly-detected bounding box may be updated with the newly-detected bounding box. Accordingly, the various systems and techniques described herein can keep track of many false positive regions and may effectively filter out false positive object detections even when the location of newly-detected bounding boxes are slightly perturbed from detection event to detection event. In various examples, notifications and/or video streaming for newly-detected bounding boxes may be suppressed if it is determined that the newly-detected bounding box is sufficiently similar to a region of merged bounding boxes having at least a threshold number of past detections (e.g., a threshold number of previously-detected bounding boxes). In some cases, the threshold number of past detections (e.g., past bounding boxes) may be dynamic. For example, a lower threshold may apply if the newly-detected bounding box is associated with a confidence score that is low (e.g., below a certain confidence score threshold).

False positive object detection events may often be time sensitive. For example, relatively transient events such as flowers growing on plants and/or puddles forming on a road, may lead to false positive object detection events while such events persist. Indeed, some conditions that lead to a large number of false positive object detection events may last only for a few hours (e.g., rain and/or weather events). Accordingly, in various examples described herein, detection events (e.g., bounding boxes representing object detections) may be associated with dynamic time to live (TTL) values (e.g., expiration values) after which the bounding box may expire and may no longer be part of a merged bounding box region (such as a false positive region). The life cycle of a bounding box associated with an object detection may be computed based on various information (such as the object detector confidence score associated with a bounding box) and the frequency of detecting bounding boxes within a false-positive region. For example, false positive regions with higher frequency of new detections may persist for longer periods of time and may thus result in more filtering out of newly-detected object detections in that same region. Conversely, if the frequency of detection associated with a false positive region decreases (e.g., due to a puddle evaporating, night changing to day, etc.), the lifecycle length of the bounding boxes in the false positive region may be shortened and/or deleted to avoid false suppression of newly-detected objects.

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PIR sensor's field-of-view by determining differential changes in the IR detected by the PIR sensor. PIR sensors often include two sensor "halves" and/or multiple sensor regions. A multi-facet lens breaks light received from a scene into multiple regions and projects these regions on to the different halves or regions of the sensor. The sensor integrates the black body radiation detected in the two halves (or in the multiple regions, depending on the sensor) and determines the differential change. The differential change is the difference in detected radiation between the two sensor halves (or between the different regions). If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by a light source of the sensor. Accordingly, PIR sensors consume relatively little power when in use.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A passive infrared sensor may be analog, with an analog signal output, or may be digital, with digital data output generated utilizing an analog-to-digital converter (ADC) (e.g. output from the ADC or output generated based on output from the ADC).

An electronic device may include one or more passive infrared sensors that the electronic device uses to detect motion of objects. Each passive infrared sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

For example, a first passive infrared sensor may have a first field-of-view (FOV) that extends a first distance from the electronic device. In some examples, the first FOV is created based on placing the first passive infrared sensor in a first direction and/or using one or more lenses (which may be a lens of the passive infrared sensor or which may be used in addition to or in replacement of a lens of the passive infrared sensor).

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g. a Boolean value or an interrupt) to a controller (e.g. a microcontroller unit or MCU) of an electronic device. Based on the received logic signal, the controller begins periodically polling or requesting PTR data (e.g. a most recent data value at the time of polling) from the IC component. For example, the controller may poll the IC component at a rate of 64 Hz. In accordance with one or more preferred implementations, the logic signal represents an interrupt that triggers additional processing based on radar data and PIR data as described herein.

In some example systems, if motion is detected in an environment monitored by a motion sensor such as a PIR sensor, the triggered motion sensor may send a signal to one or more camera devices associated with the motion sensor. The signal may be effective to cause the camera device(s) to begin capturing image data and/or video data. For example, a PIR sensor and a camera device may be situated in a particular room of a building. If the PIR sensor is triggered (e.g., due to a human walking through the room), the PIR sensor may send a signal to the camera device indicating that motion has been detected by the PIR sensor. In response to receipt of the signal from the PIR sensor, the camera may be configured to begin capturing video.

In some examples, auxiliary motion detection may be used in addition to a passive PIR sensor in order to corroborate that motion that is likely to be of interest is occurring. For example, radar-based motion detection, intra-frame comparison techniques, object detectors, etc., may be used to corroborate motion detected by PIR sensors prior to capturing and/or streaming image data to one or more remote devices. In various examples described herein, computer vision-based object detectors may be used to determine whether or not detected motion (e.g., detected by a PIR-based motion sensor and/or based on one or more other motion sensors) relates to movement of an object-of-interest (e.g., a person, animal, vehicle, etc.). Object detectors may be trained to detect various objects of interest. For example, CNN-based object detectors may be trained to detect representations of humans, dogs, cats, cars, etc., appearing or partially appearing in image data on the basis of labeled training data in which such classes of objects appear.

Machine learning techniques, such as the ML-based object detectors described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Storage and/or use of data related to a particular person or device (e.g., video data, notification suppression data, etc.) may be controlled by a user using privacy controls associated with a camera device and/or a companion application associated with the camera device. Users may opt out of storage of personal, device state (e.g., a paused playback state, etc.), and/or video data and/or may select particular types of data that may be stored while preventing aggregation and storage of other types of data. Additionally, aggregation, storage, and use of personal, device state, and/or video data, as described herein, may be compliant with privacy controls, even if not legally subject to them. For example, video data and other data described herein may be treated as if it was subject to acts and regulations, such as the Health Insurance Portability and Accountability Act (HIPAA) and the General Data Protection Regulation (GDPR), even if it is not actually subject to these acts and regulations. Additionally, users may opt out of data collection, and/or may opt to delete some or all of the data used by the various techniques described herein, even where deletion or non-collection of various data may result in reduced functionality and/or performance of various aspects of the systems described herein.

FIG. 1 is a diagram 100 illustrating multiple object detection events (represented by bounding boxes 108a, 108b, 108c), in accordance with various aspects of the present disclosure. In the example, a false positive detector 102 is configured in communication with a camera device 120 and one or more non-transitory computer-readable memories 103, in accordance with various aspects of the present disclosure. In various examples, the computing device(s) implementing false positive detector 102 may be configured in communication over a network 104. Although depicted as separate components in FIG. 1, the false positive detector 102 may be part of the camera device 120. In some examples, the false positive detector 102 may be implemented in one or more chips of camera device 120. For example, one or more of the techniques used by the false positive detector 102 may be performed using an application specific integrated circuit (ASIC) and/or using a field programmable gate array (FPGA). In some other examples, various techniques of the false positive detector 102 may be instantiated in software executed by one or more processors of the camera device 120 and/or of the false positive detector 102. In yet other examples, the false positive detector 102 may be instantiated using some combination of hardware and software. In various examples, the camera device 120 may be a battery-powered camera device. However, in at least some other examples, the camera device 120 may be wired to mains and/or may use mains power with a battery back-up.

Network 104 may be a communication network such as a local area network (LAN), a wide area network (such as the Internet), or some combination thereof. The one or more computing devices implementing the false positive detector 102 may communicate with non-transitory computer-readable memory 103 (e.g., either locally or over network 104). The non-transitory computer-readable memories 103 may store instructions that may be effective to perform one or more of the various techniques described herein.

As shown in FIG. 1, false positive detector 102 may capture and/or receive video data (comprising sequential frames of image data) as a result of being triggered by a PIR sensor to "wake up" and begin capturing image data using camera device 120. In the example scene (representing the field-of-view of camera device 120) in FIG. 1, three bounding boxes 108a, 108b, and 108c may have been detected by an object detector. In the example, the object detector may be trained to detect humans appearing in image data. Accordingly, since the three bounding boxes 108a, 108b, and 108c surround a sign and sign post, these three object detection events represent false detections. Although all three bounding boxes 108a, 108b, 108c appear on a single image frame in FIG. 1, it should be appreciated that in an actual system, the three bounding boxes 108a, 108b, 108c may have been detected on different image frames of a video. In fact, the three bounding boxes 108a, 108b, 108c may have been detected for different wake-up events of camera device 120 that may have been separated by intervening time periods during which the camera device 120 was in a low power sleep mode.

As shown, each of the bounding boxes 108a, 108b, 108c are of slightly different sizes and/or are at slightly different locations within the image frame. In various examples described in further detail below, bounding boxes 108b, 108c may be historical bounding boxes (e.g., detected at some past points in time), while bounding box 108a may represent a newly-detected bounding box that may be under evaluation for possible suppression as a false positive. Using a standard IoU comparison between newly-detected bounding box 108a and either of past bounding boxes 108b, 108c may, in some instances, result in a determination that the newly-detected bounding box 108a is not a false detection as the IoU value may be lower than some threshold, particularly since the bounding boxes are relatively small in size.

However, various similarity determination techniques described in further detail below may be used to determine that the newly-detected bounding box 108a is sufficiently similar to one or more of bounding boxes 108b, 108c. Accordingly, newly-detected bounding box 108a may be determined to be a false positive detection (e.g., based on similarity to a false positive region made up of past detections (bounding boxes 108b, 108c)). Notifications and/or video streaming may be suppressed due to newly-detected bounding box 108a being detected as a false positive. In addition, the merged region of bounding boxes comprising bounding boxes 108b, 108c may be updated to incorporate newly-detected bounding box 108a (e.g., in a false positive region stored in memory). Further, the newly-detected bounding box 108a may be stored in memory in association with a TTL value, after expiration of which the newly-detected bounding box 108a may be deleted from the false positive region in memory. Additionally, as described in further detail below, in some examples, the TTL values of other bounding boxes in the false positive region (e.g., bounding boxes 108b, 108c) may be updated (e.g., extended) based on a newly-detected bounding box associated with the region and/or based on the number of bounding boxes making up a false positive region exceeding some threshold number of bounding boxes (e.g., >3).

Figure 2A:
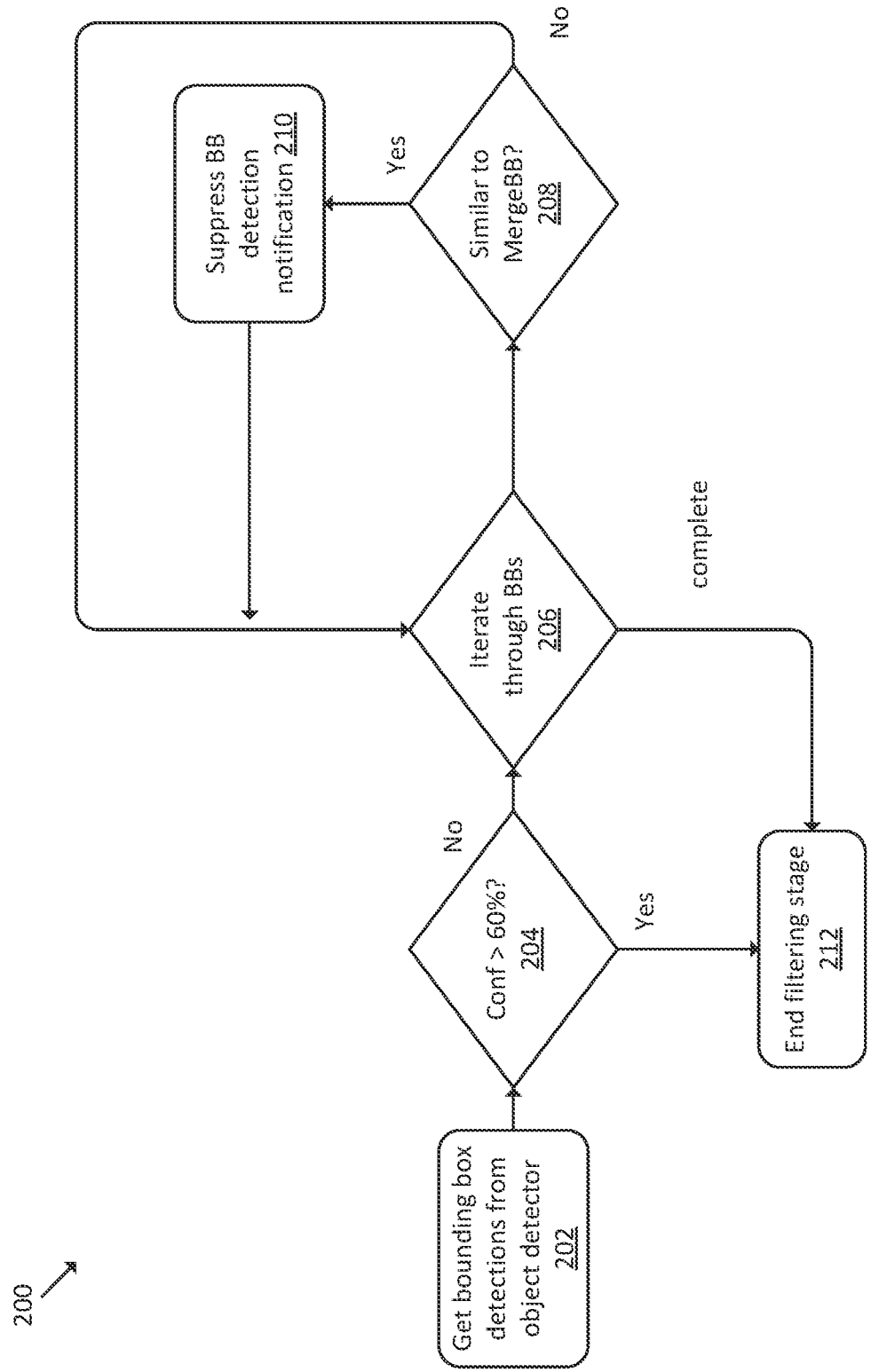
FIG. 2A depicts an example process for filtering out false positive object detection events, in accordance with various aspects of the present disclosure.

FIG. 2A depicts an example process 200 for filtering out false positive object detection events, in accordance with various aspects of the present disclosure. The actions of the process 200 may represent a series of instructions comprising computer readable machine code (e.g., computer executable instructions stored in computer readable media) executable by a processing unit of false positive detector 102 and/or camera device 120, although various operations may be implemented in hardware. In various examples, the computer readable machine codes may be comprised of instructions selected from a native instruction set of the processor(s) and/or an operating system of the computing device.

At action 202, the bounding box detection(s) may be received from the object detector. The object detector may be executing on camera device 120 and/or remotely. The bounding box data may include (or be associated with) one or more frames of image data in which an object has been detected. The bounding box data may define an enclosed area within the image frame(s) that relate to an object detected by the object detector. For example, the bounding box data may comprise corner coordinates (in the two-dimensional pixel frame) of rectangular bounding boxes. In some other examples, a segmentation mask may be provided instead of a bounding box (wherein pixel values deemed by the object detector to be associated with a particular object are so identified). In various examples, the bounding box data may include data identifying the detected class of object (e.g., person, dog, cat, automobile, etc.). Furthermore, the bounding box data may include a confidence score indicating a confidence in the object detectors detection of an object of the relevant class.

At action 204, the process 200 may determine whether the confidence score of a given bounding box being evaluated is above a particular threshold. In the example of FIG. 2A, a determination may be made of whether the confidence score of the received bounding box is greater than 60%. However, this threshold is merely an example and any desired threshold may be used in accordance with the desired implementation. If the confidence score is above the relevant confidence score threshold at action 204, the detection event may be deemed an event of interest. As such, the filtering stage may end at action 212. In this case, notifications and/or video streaming may be initiated as a result of the event (in accordance with the relevant logic used by the camera device 120) as the event has been deemed to be a true object detection event that is likely to be of interest.

Conversely, each detected bounding box with a confidence score below the relevant threshold (e.g., 60% in the example of FIG. 2A) may be iterated, at action 206. For each such bounding box (BB), a determination may be made at action 208 whether that bounding box is sufficiently similar to a merged bounding box ("mergeBB"). A merged bounding box is at least one historical bounding box that is currently in memory (e.g., which has not expired) within a region. A merged region of bounding boxes may be one or more historical bounding boxes that are detected with confidence scores below the relevant threshold, which are currently in memory (e.g., unexpired). In various examples, if there are a sufficient number of merged bounding boxes currently in memory for a region, the region may be designated a false positive region (e.g., >3 bounding boxes in a merged region). Any newly-detected bounding box that is sufficient similarity to a false positive region may result in suppression of notifications and/or video streaming (at action 210). In other words, notifications associated with newly-detected bounding boxes that are sufficiently similar to a false positive region may be filtered out at action 210 (suppress bounding box detection notification). Once all newly-detected bounding boxes have been iterated through, the filtering stage may end at action 212.

Figure 2B:
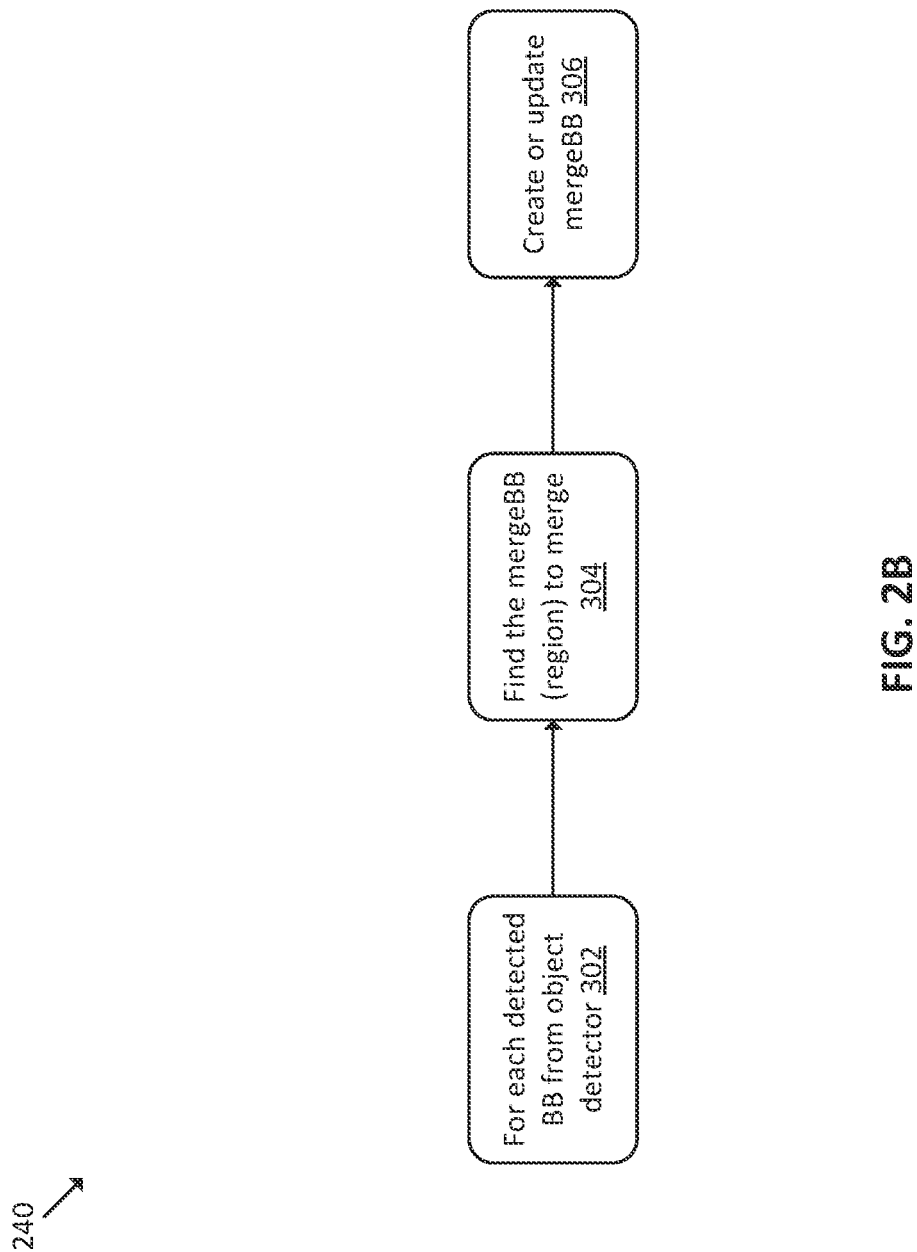
FIG. 2B depicts an example process for updating a region of merged bounding boxes based on a newly-detected bounding box, in accordance with various aspects of the present disclosure.

FIG. 2B depicts an example process 240 for updating a region of merged bounding boxes based on a newly-detected bounding box, in accordance with various aspects of the present disclosure. At action 302, if a bounding box detection event has lower than the relevant threshold confidence score (e.g., as determined at action 204), a determination may be made (at action 304) as to which merged bounding box region to merge the newly-detected bounding box. The newly-detected bounding box may be merged into the merged bounding box region (by storing data representing its location in the frame and its TTL value in memory at action 306). This may be determined based on the similarity between the newly-detected bounding box and one or more historical bounding boxes that are persisted in memory (e.g., unexpired historical bounding boxes). If there is no current historical bounding box to which the newly-detected bounding box is sufficiently similar, a new merged bounding box that is made up of the newly-detected bounding box with a TTL value may be generated and persisted in memory (action 306). Conversely, if there are one or more historical bounding boxes persisted in memory (e.g., a merged bounding box region) to which the newly-detected bounding box is sufficiently similar, the newly-detected bounding box may be merged with the region and persisted in memory. The specific methods for assessing similarity between bounding boxes are described in further detail below. As previously described, once a merged bounding box region has greater than or equal to a threshold number of bounding boxes, the region may be considered a false positive region and new detections that are sufficiently similar to that region may be filtered out (e.g., notifications and/or video streaming related to those newly-detected events may be suppressed).

Figure 3A:
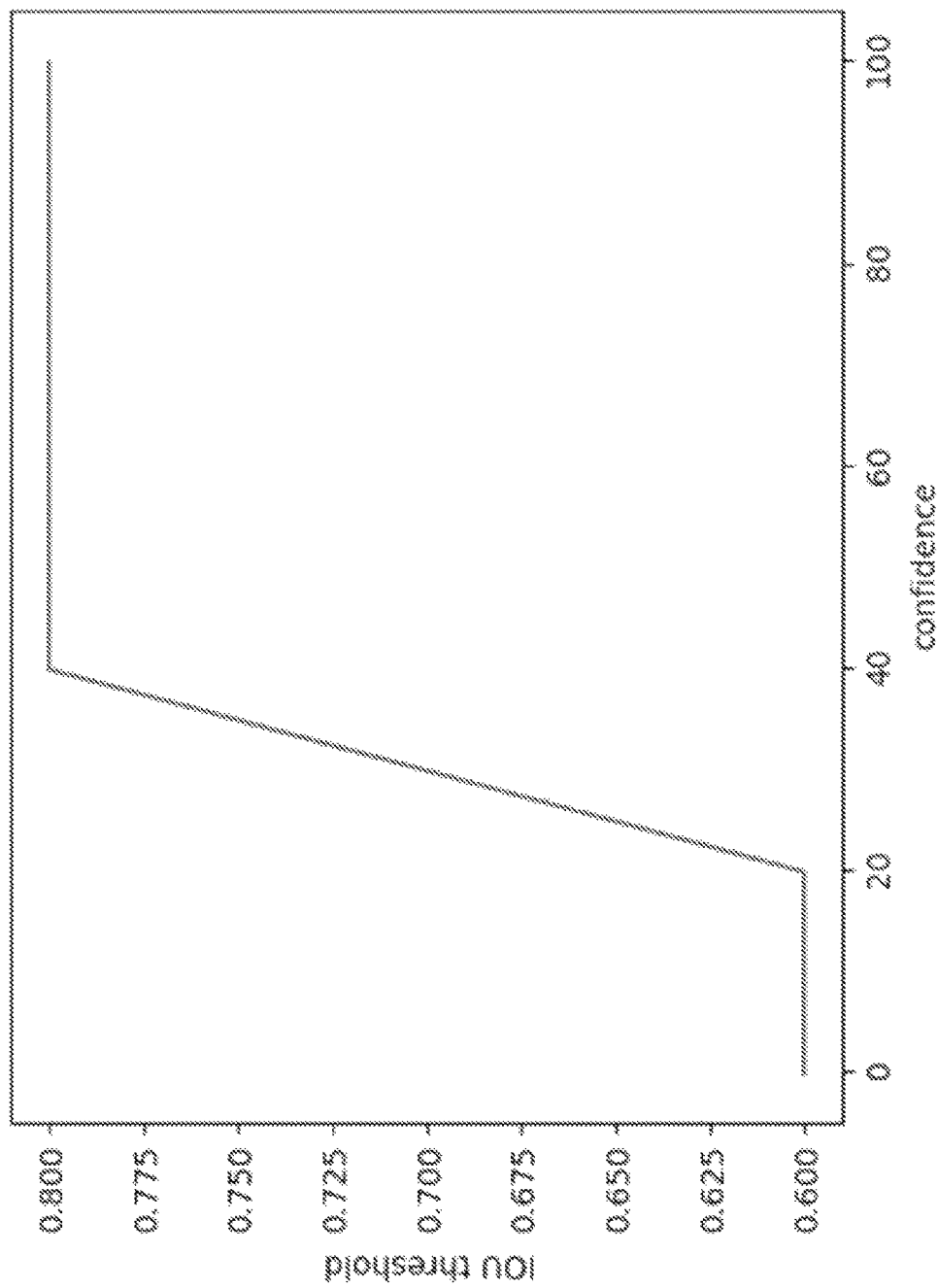
FIG. 3A depicts an example similarity metric for determining a similarity between a newly-detected bounding box and a previously-detected bounding box, in accordance with various aspects of the present disclosure.

FIG. 3A depicts an example similarity metric for determining a similarity between a newly-detected bounding box and a previously-detected bounding box, in accordance with various aspects of the present disclosure. The example chart 300 in FIG. 3A may be part of a multi-tiered similarity determination approach or may be used on its own. In the example, the confidence score associated with a newly-detected bounding box may be determined. The IoU threshold may be dynamically determined as a function of the confidence score. In the example chart 300 depicted in FIG. 3A, the IoU threshold linearly increases from 0.6 to 0.8 as the confidence score increases from 20% to 40%. Newly-detected bounding boxes that have a higher IoU when compared to the threshold IoU may be filtered out (and/or may be merged with the merged bounding box region). Using the dynamic IoU threshold shown in FIG. 3A, newly-detected bounding boxes associated with low confidence scores are compared to a relatively low IoU threshold and are thus more aggressively filtered out.

Figure 3B:
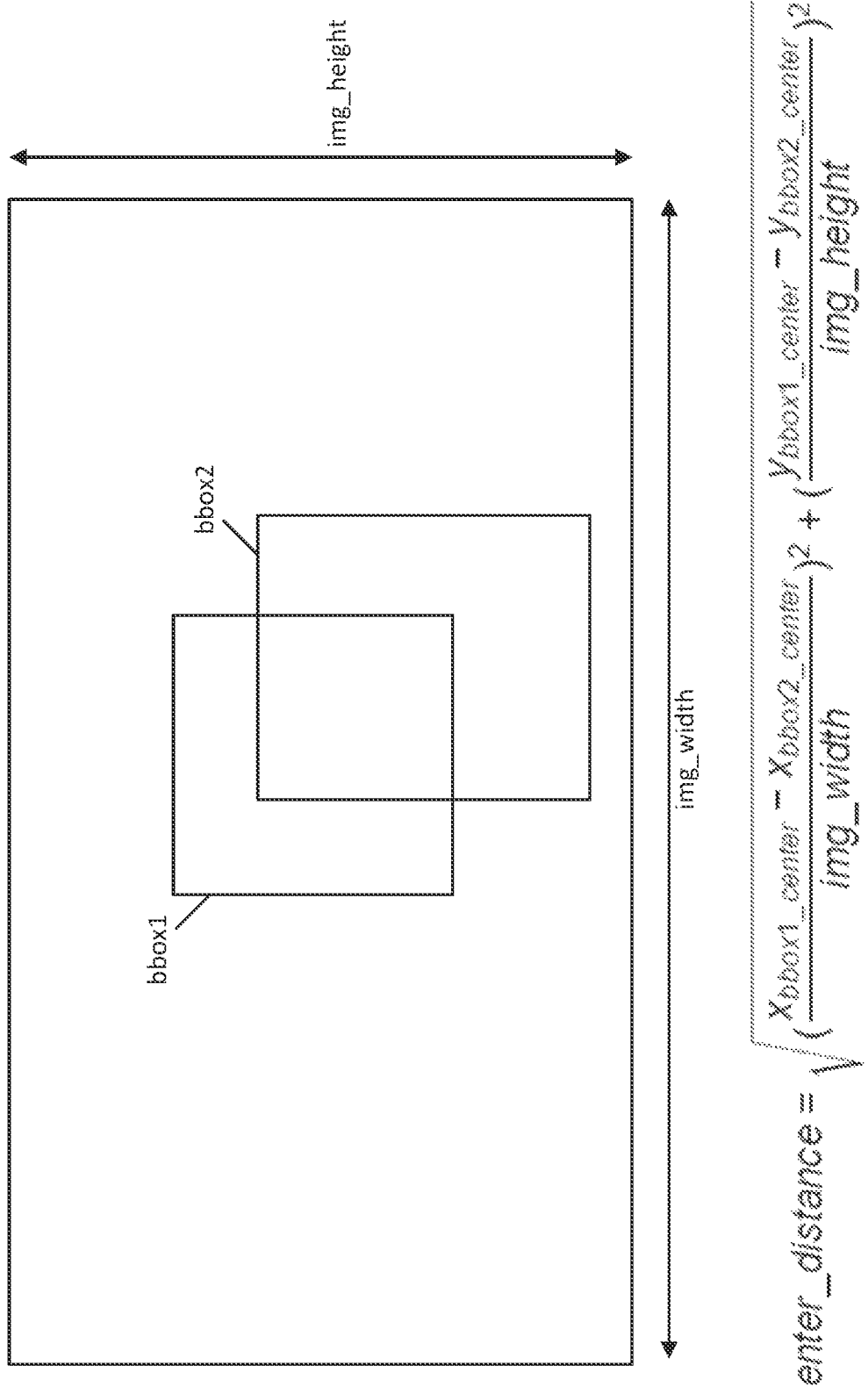
FIG. 3B depicts another example similarity metric for determining a similarity between a newly-detected bounding box and a previously-detected bounding box, in accordance with various aspects of the present disclosure.

FIG. 3B depicts another example similarity metric for determining a similarity between a newly-detected bounding box and a previously-detected bounding box, in accordance with various aspects of the present disclosure. In some examples, the geometric similarity metric (based on a difference between the center point (center value) of two bounding boxes) depicted in FIG. 3B may be used in addition to the similarity metric depicted in FIG. 3A. For example, for bounding boxes with a size of <0.8% (or some other desired threshold with respect to a historical bounding box in a merged bounding box region) and with a confidence score <40% (or some other desired threshold), and which have an IoU under the dynamic threshold in FIG. 3A may be compared using the center distance metric shown in FIG. 3B. This geometrical similarity metric determines the center distance between the two bounding boxes. If the center distance is less than some threshold value (e.g., a threshold distance such as 0.005), the newly-detected bounding box may be filtered out (even though it would not have been filtered back using the dynamic IoU similarity metric in FIG. 3A alone).

In various examples, a weighted combination of visual and geometric similarity metric scores may be used to compute an overall similarity score. An example of a visual similarity score may be to generate visual embeddings for the pixels bounding by each of the two bounding boxes and then to determine Euclidean distance (and/or some other numeric distance) between the resulting embedding vectors. In another example, image data representing each of the two bounding boxes (e.g., the pixel values confined by the bounding boxes, cropped from the image frames) may be input into a CNN-based machine learning model that may be trained to output a similarity score. In some further examples, probability models (e.g., Gaussian distribution) may be used to compute geometric similarity based on the distance between the bounding box's centers. In some further examples, weighted combinations of the various different similarity metrics may be used to compute an overall similarity score, as desired. For example, in accordance with one or more preferred implementations, a visual similarity value is determined to be a calculated intersection over union value, and a geometric similarity value is determined using a probability model such as a Gaussian distribution or linear distribution probability model, e.g. $Pr(Y=1|X=x)=x'B$. In accordance with one or more preferred implementations, a center distance is determined, based on (x,y) coordinates for a first bounding box represented as (bboxcenter1x, bboxcenter1y) and (x,y) coordinates for a second bounding box represented as (bboxcenter2x, bboxcenter2y), as center distance=squareroot((bboxcenter1x−bboxcenter2x)/imagewidth)^2+(bboxcenter1y−bboxcenter2y)/imageheight)^2). In accordance with one or more preferred implementations, a probability of Y=1 is determined as a function of X=centerdistance, e.g. $Pr(Y=1|X=centerdistance)=centerdistance'*B$. In accordance with one or more preferred implementations, an aspect ratio or ratio or difference of aspect ratios is utilized as well, e.g. $Pr(Y=1|X=[centerdistance, aspectratio])=[centerdistance, aspectratio]'*B$. In accordance with one or more preferred implementations, a geometric similarity is determined based on such, e.g. geometric similarity=$Pr(Y=1)$. In accordance with one or more preferred implementations, an overall similarity is determined based on a determined visual similarity, a weight associated with visual similarity, a determined geometric similarity, and a weight associated with geometric similarity, e.g. overall_similarity=w1*visual_similarity+w2*geometric_similarity.

Figure 4:
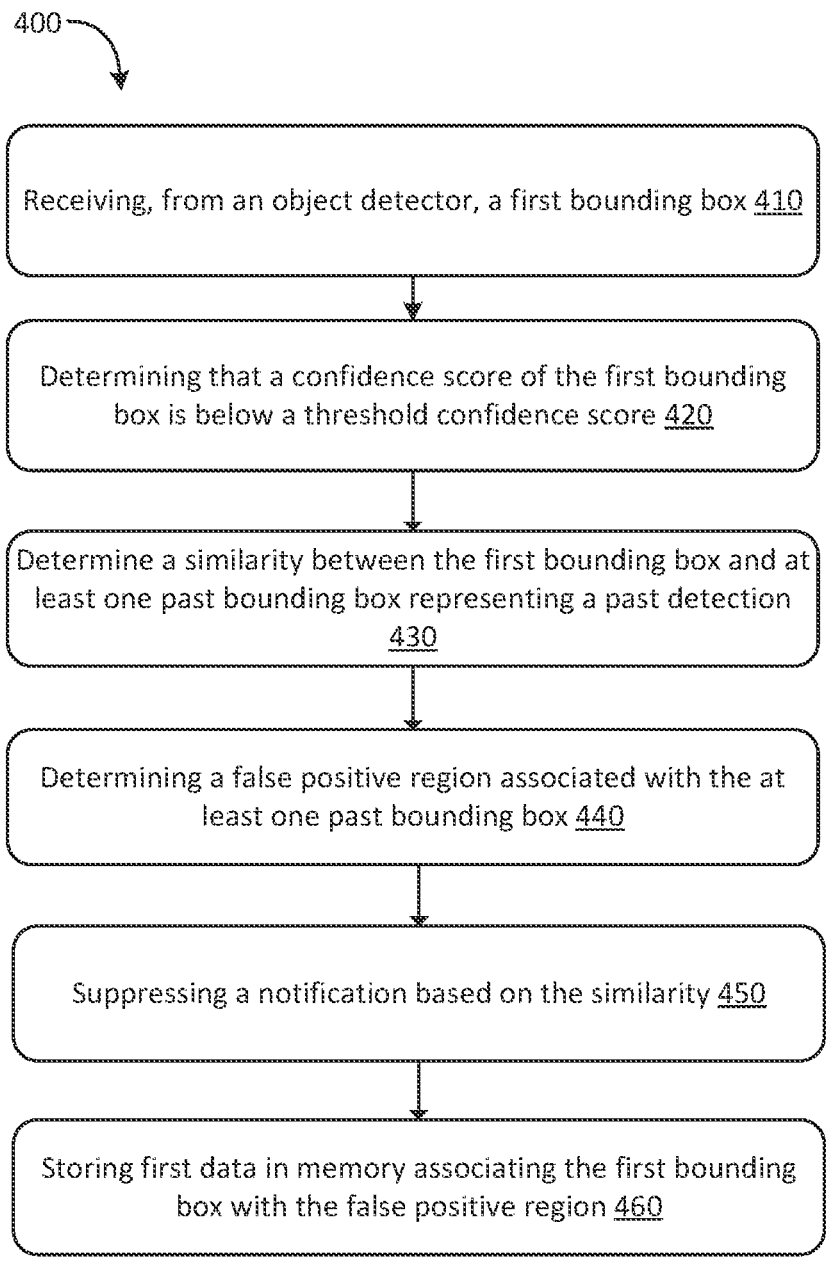
FIG. 4 depicts example process for detecting a false positive object detection based on similarity with previous object detections, in accordance with various embodiments of the present disclosure.

FIG. 4 depicts another example process 400 for detecting a false positive object detection based on similarity with previous object detections, in accordance with various embodiments of the present disclosure. The actions of the process 400 may represent a series of instructions comprising computer readable machine code (e.g., computer executable instructions stored in computer readable media) executable by a processing unit of false positive detector 102 and/or camera device 120, although various operations may be implemented in hardware. In various examples, the computer readable machine codes may be comprised of instructions selected from a native instruction set of the processor(s) and/or an operating system of the computing device.

Process 400 may begin at action 410, at which a first bounding box may be received from an object detector. The first bounding box may define an area within the image frame at which the object detector has detected an object. The first bounding box may also include data indicating a class of the object detected (e.g., human, dog, vehicle) and/or a confidence score indicating a confidence in the detection.

Process 400 may continue at action 420, at which a determination may be made that a confidence score of the first bounding box is below a threshold confidence score. For example, the confidence score of the object detection represented by the bounding box received at action 410 may be below some confidence score threshold (e.g., <60%).

Processing may continue at action 430, at which a similarity may be determined between the first bounding box and at least one past bounding box representing a past object detection. For example, for each bounding box that is currently persisted in memory (e.g., for each unexpired historical bounding box), a similarity score may be computed by comparing the newly-detected bounding box (e.g., the bounding box received at action 410) to the historical bounding box using one or more of the similarity metrics described herein.

Processing may continue at action 440, at which a false positive region associated with the at least one past bounding box may be determined. For example, it may be determined that the similarity between the newly-detected bounding box and the at least one past bounding box is above a relevant similarity threshold. Additionally, it may be determined that the at least one past bounding box is associated with a merged bounding box region that includes at least some threshold of past unexpired bounding box detections (e.g., >3 unexpired historical bounding boxes). Since the merged bounding box region is associated with greater than the threshold number of historical bounding boxes, the merged bounding box region may be considered a false positive region.

Processing may continue at action 450, at which a notification may be suppressed based on the similarity (e.g., based on some similarity threshold being exceeded). Additionally, the notification (and/or video streaming) may be suppressed based on the region being a false positive region (e.g., based on the region being associated with greater than the threshold number of historical, unexpired bounding boxes).

Processing may continue at action 460, at which first data may be stored in memory, the first data associated the first bounding box with the false positive region. Additionally, the first data may be associated with a TTL value. The TTL associated with the historical bounding boxes in the false positive region may also, in some cases, be updated/extended, as described in further detail below.

Figure 5:
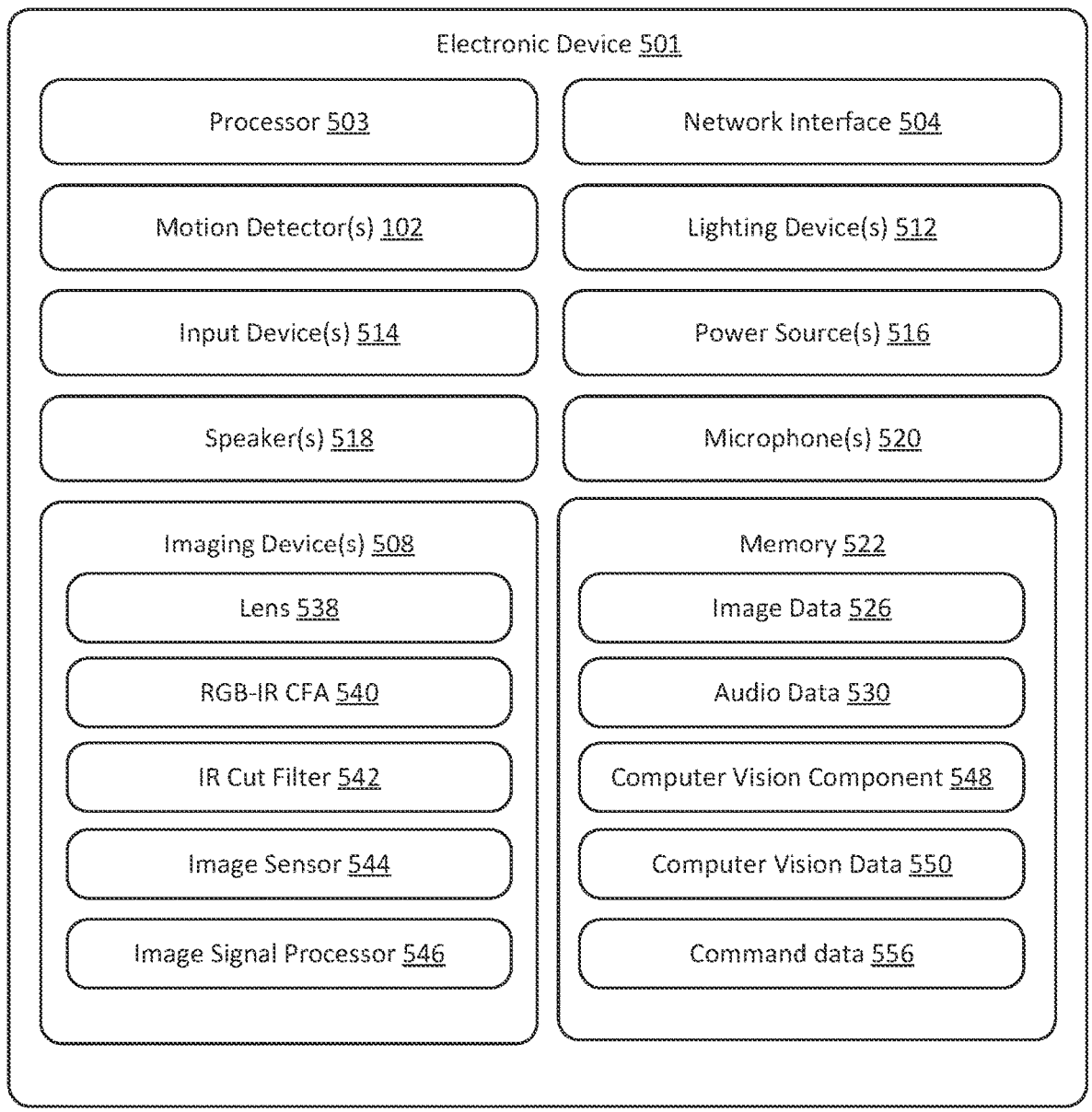
FIG. 5 depicts an example camera device be used to capture image and/or video data, in accordance with various aspects of the present disclosure.

FIG. 5 depicts an example camera device be used to capture image and/or video data, in accordance with various aspects of the present disclosure. As shown, the electronic device 501 may include one or more processors 503, one or more network interfaces 504, one or more motion detectors, one or more imaging devices 508, one or more lighting devices 512, one or more input devices 514, one or more power sources 516, one or more speakers 518, one or more microphones 520, and memory 522. In various examples, the electronic device 501 may be an example of a camera device, such as camera device 120 shown and described in reference to FIG. 1. It should be noted that the various components depicted for electronic device 501 are merely examples of components that may be included in a device with which false positive detector 102 and/or the techniques described herein may be used. Additional, fewer, and/or different components may be used in accordance with the desired implementation.

As described herein, the camera device 120 may include one or more (alone or in combination) different types of motion sensors. For example, in some embodiments, the false positive detector 102 may comprise passive infrared (PIR) motion sensors, which may be secured on or within a PIR sensor holder that may reside behind a lens (e.g., a Fresnel lens). As previously described, the PIR sensors may detect IR radiation in a field of view, and produce an output signal (typically a voltage) that changes as the amount of IR radiation in the field of view changes. The amount of voltage in the output signal may be compared, by the processor(s) 503, for example, to one or more threshold voltage values to determine if the amount of voltage in the output signal is indicative of motion, and/or if the amount of voltage in the output signal is indicative of motion of an object that is to be captured by the imaging device(s) 508. In some examples, the processor(s) 503 may determine the distance based on the amount of voltage in the output signal. Additionally, or alternatively, in some examples, the processor(s) 503 may determine the distance based on which camera device 120 detected the object.

In various examples, circuitry may be included in the electronic device 501 and/or in the image signal processor 546 that may be effective to perform various motion detection techniques. In various examples, a PIR sensor, radar sensor, or other motion sensor may be used to perform coarse motion detection. Once the PTR sensor or other motion sensor is triggered, other motion sensing techniques and/or ML-based object detection may be triggered (e.g., in a second operation mode). In various examples, the motion detection technologies may include logic to compare two or more frames of image data as an implementation of inter-frame comparison motion detection.

An imaging device 508 may include any device that includes an image sensor 544, such as a charge-coupled device (CCD) and/or an active-pixel sensor (CMOS sensor), that is capable of generating image data 526 (which may represent, and/or include, the frames of image data described herein), representing one or more images (e.g., a video). The imaging device 508 may include a lens 538 that is effective to focus light on the image sensor 544. The light may be filtered by an RGB color filter array (CFA) 540 (e.g., a Bayer CFA) or an RGB-IR CFA. In one aspect of the present disclosure, the image sensor 544 may comprise a complementary metal-oxide semiconductor (CMOS) array and may be capable of recording high definition (e.g., 722*p*, 1800*p*, 4K, 8K, etc.) image and/or video files. The image sensor 544 may comprise a plurality of photosensors that may transform light into electrical signals. Such electrical signals may be represented by numerical values (e.g., floating point numbers) that may be processed using the image signal processor 546. Each photosensor of the image sensor 544 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 508 are in night mode. In some examples, the electronic device 501 may include an IR cut filter 542 to filter out infrared light from the light path of the photosensors when the electronic device 501 is configured in day mode. The IR cut filter 542 may be removed from the light path such that infrared light may reach the photosensors when the electronic device 501 is configured in night mode. In various examples, the electronic device 501 may account for IR light detection for accurate color reproduction using image processing techniques without using an IR cut filter 542.

The imaging device 508 may include a separate image signal processor 546, or the processor(s) 503 may perform the camera processing functionality. The processor(s) 503 (and/or camera processor) may include an encoding and compression chip. In some embodiments, the processor(s) 503 (and/or the camera processor) may comprise a bridge processor. The processor(s) 503 (and/or the camera processor) may process video recorded by the image sensor and may transform this data into a form suitable for transfer by the network interface(s) 504. In various examples, the imaging device 508 also includes memory, such as volatile memory that may be used when data is being buffered or encoded by the processor(s) 503 (and/or the camera processor). For example, in certain embodiments the camera memory may comprise synchronous dynamic random-access memory (SD RAM).

The lighting device(s) 512 may be one or more light-emitting diodes capable of producing visible light and/or infrared light when supplied with power (e.g., to enable night vision). In some embodiments, when activated, the lighting device(s) 512 illuminates a light pipe. In some examples, the electronic device 501 uses the lighting device(s) 512 to illuminate specific components of the electronic device 501, such as the input device(s) 514. This way, users are able to easily see the components when proximate to the electronic device 501. The lighting device(s) 512 may include an infrared-light light emitting diode (LED), a visible-light LED, etc. In various examples, the electronic device 501 may include an ambient light sensor that may be used to transition the electronic device 501 and/or a camera thereof between day and night mode.

An input device 514 may include, but is not limited to, a button, a touch-sensitive surface, a switch, a slider, and/or any other type of device that allows a user to provide input to the electronic device 501. For example, if the electronic device 501 includes a doorbell, then the input device 514 may include a doorbell button. In some examples, based on receiving an input, the processor(s) 503 may receive a signal from the input device 514 and use the signal to determine that the input device 514 received the input. Additionally, the processor(s) 503 may generate input data representing the input received by the input device(s) 514. For example, the input data may represent the type of input (e.g., a push to a button), a time that the input occurred, and/or the like. In at least some examples, the electronic device 501 may be a video-enabled doorbell.

The power source(s) 516 may include one or more batteries that provide power to the electronic device 501. However, in other examples, the electronic device 501 may not include the power source(s) 516. In such examples, the electronic device 501 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 518 may be any electromechanical device capable of producing sound in response to an electrical signal input. The microphone(s) 520 may be an acoustic-to-electric transducer or sensor capable of converting sound waves into audio data 530 representing the sound. The speaker(s) 518 and/or microphone(s) 520 may be coupled to an audio CODEC to enable digital audio received by user devices to be decompressed and output by the speaker(s) 518 and/or to enable audio data captured by the microphone(s) 520 to be compressed into digital audio data 530. In some examples, the electronic device 501 includes the speaker(s) 518 and/or the microphone(s) 520 so that the user associated with the electronic device 501 can communicate with one or more other users located proximate to the electronic device 501. For example, the microphone(s) 520 may be used to generate audio data representing the speech of the one or more other users, which is then sent to the camera device. Additionally, the speaker(s) 518 may be configured to output user speech of the user, where the user's user speech may also be represented by audio data 530.

In some examples, the electronic device 501 determines that the start of the video is the first frame of the video. In some examples, such as when the electronic device 501 continuously generates the image data (e.g., the electronic device 501 does not turn off the imaging device(s) 508), the start of the video corresponds to the portion of the video that the imaging device(s) 508 were generating right after detecting an event. For example, the start of the video may correspond to the first frame of the video after detecting the event. In other examples, such as when the electronic device 501 does not continuously generate the image data 526 (e.g., the electronic device 501 turns off the imaging device(s) 508 until detecting an event such as a motion event, the start of the video corresponds to the first frame of the video that is generated by the imaging device(s) 508.

As further illustrated in the example of FIG. 5, the electronic device 501 may include the computer-vision component 548. The computer-vision component 548 may be configured to analyze the image data 526 using one or more computer-vision techniques and output computer-vision data 550 based on the analysis. In various examples, the computer vision component 548 may include the object detector(s) described herein. The computer-vision data 550 may represent information, such as the presence of an object represented by the image data 526, the type of object represented by the image data 526, locations of the object relative to the electronic device 501, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 550 may further represent one or more bounding boxes indicating the respective location of each object represented by the image data 526. In various examples, the computer-vision component 548 may implement the ML-based object detection techniques and/or the embedding generation techniques described herein. The computer-vision data 550 may also include the false positive detection regions and/or the historical (past) bounding box data of the merged bounding box regions along with other data used to detect false positive object detections, as described herein. Accordingly, the memory 522 is shown as including the false positive detector 102. However, in at least some other examples, the false positive detector 102 may be executed at least partially on one or more remote devices in communication with electronic device 501.

For example, the computer-vision component 548 may analyze the image data 526 using one or more computer-vision techniques such as, but not limited to, object detection technique(s), object tracking technique(s), semantic segmentation technique(s), instance segmentation technique(s), object co-segmentation techniques, and/or any other computer vision technique(s). The computer-vision component 548 may generate confidence scores for each object detection and/or segmentation. Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 548 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 548 may be used to evaluate cropped activity zones (e.g., motion zones) in which motion has been detected using the motion detection techniques described herein. In various examples, upon detecting an object of interest in the cropped activity zone, the electronic device may begin encoding and transmitting captured video to one or more remote devices.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 548 may use object detection technique(s) (e.g., convolutional neural networks, recurrent neural networks, visual transformers, etc.) that use computer-vision analysis to perform informative region selection, features extraction, and then classification of object(s) represented by the image data 526. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once (YOLO) technique(s), deformable convolutional networks technique(s), ad/or the like. In various examples, the inter-frame comparison techniques described herein may be embodied in logic stored in memory 522.

The electronic device 501 may also store command data 556. In some circumstances, a user of the electronic device 501 may want to receive a live view from the electronic device 501. The command data 556 may represent an identifier associated with the electronic device 501, a command to generate the image data 526, a command to send the image data 526, and/or the like. In some examples, the electronic device 501 may then analyze the command data 556 and, based on the identifier, determine that the command data 556 is directed to the electronic device 501. For example, the electronic device 501 may match the identifier represented by the command data 556 to an identifier associated with, and stored by, the electronic device 501. Additionally, the electronic device 501 may cause the imaging device(s) 508 to begin generating the image data 526 (e.g., if the imaging device(s) 508 are not already generating the image data 526) and send the image data 526 to the one or more computing devices implementing the false positive detector 102, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 6:
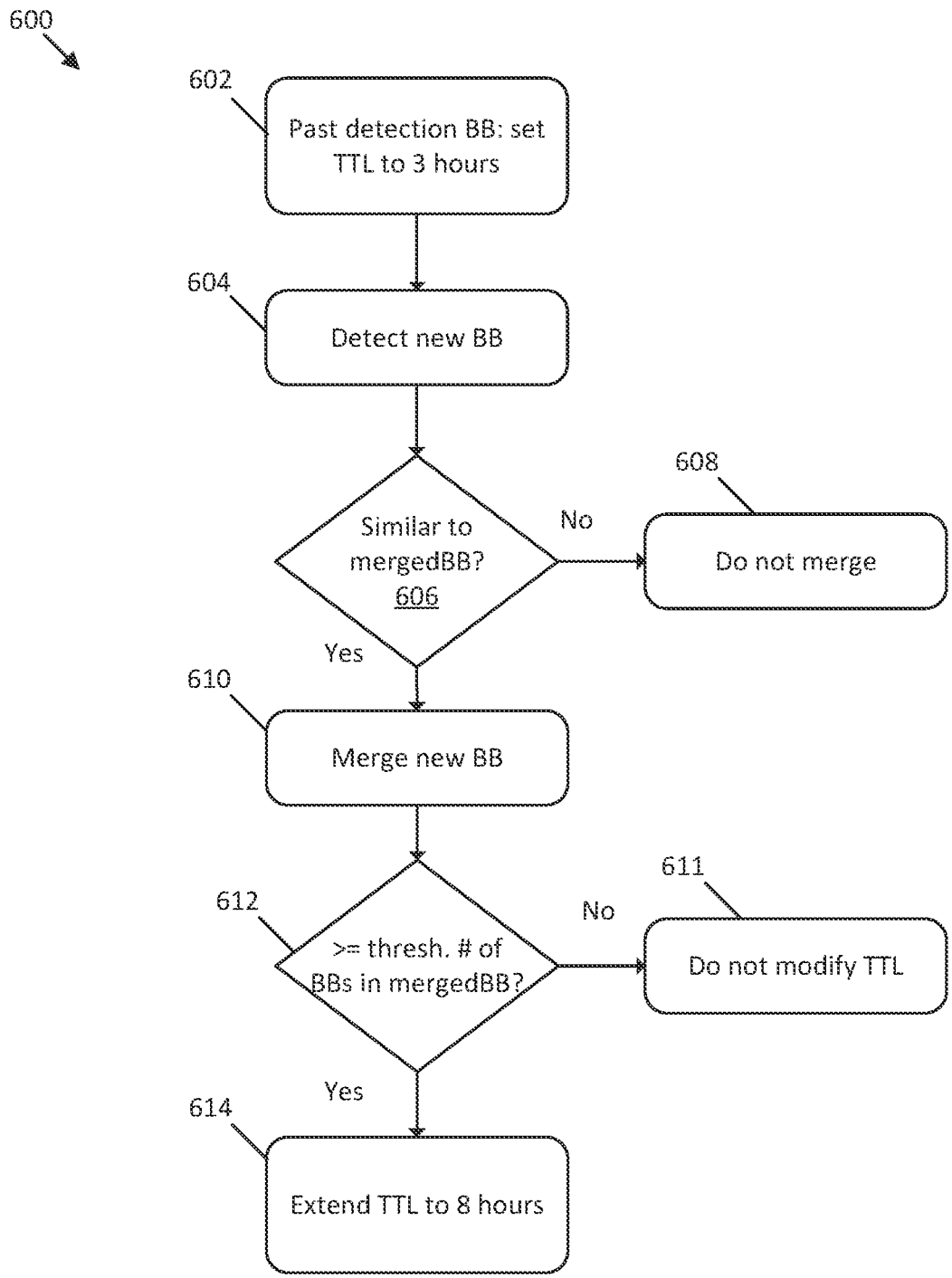
FIG. 6 is another example process that may be used to dynamically determine an amount of time that data representing past bounding box detections are to be persisted in memory, in accordance with various examples described herein.

FIG. 6 is another example process 600 that may be used to dynamically determine an amount of time that data representing past bounding box detections are to be persisted in memory, in accordance with various examples described herein. The actions of the process 600 may represent a series of instructions comprising computer readable machine code (e.g., computer executable instructions stored in computer readable media) executable by a processing unit of false positive detector 102 and/or camera device 120, although various operations may be implemented in hardware. In various examples, the computer readable machine codes may be comprised of instructions selected from a native instruction set of the processor(s) and/or an operating system of the computing device.

Process 600 may begin at action 602, at which a bounding box for an object detection may be saved in memory with a TTL value of 3 hours. It should be noted that this particular TTL is merely an example and any desired TTL value may be used in accordance with the desired implementation. In various examples and as described above in FIG. 2A, the bounding box data for the object detection event may be saved in memory (e.g., as an initial bounding box of a merged bounding box region) with the 3 hour TTL value only if the confidence score output by the object detector is less than a threshold (e.g., <60%).

At action 604, a new object detection event may occur. The new object detection may be associated with a new bounding box. At action 606, a determination may be made whether the newly detected bounding box is similar to the merged bounding box region (e.g., the past object detection from action 602). This similarity determination may be made as described in the various examples herein. If the similarity score (computed using any of the various techniques described herein) exceeds a similarity threshold, the newly-detected bounding box may be merged into the merged bounding box region at action 610. The merged bounding box detected at action 604 may initially have the default TTL value (e.g., 3 hours). If the similarity score does not exceed the relevant similarity threshold at action 606, processing may proceed to action 608 (Do not merge). In this case, the user may be sent a notification of the detection event and the newly-detected bounding box may form a new merged bounding box region with a default TTL value (e.g., 3 hours).

If the new bounding box is merged with a merged bounding box region at action 610, a determination may be made at action 612 of whether the number of bounding boxes associated with the merged bounding box region ("mergedBB") exceeds a threshold number (e.g., >3 bounding boxes). If not, the TTL may remain as the default TTL value (e.g., 3 hours) (action 611). If so, at action 614, the TTL of the newly-detected bound box of the merged region may be extended (e.g., to 8 hours or some other desired value). This extension of the TTL value may be used to suppress notifications since there are a relatively high number of low confidence object detections occurring within a similar region of the camera's field-of-view.

In some examples, a dynamic frequency threshold may be used to reduce the risk of suppressing true positive object detection events. For example, a merged bounding box region may be deemed a false positive region when there are greater than a threshold number of unexpired historical bounding boxes in that region (e.g., Freq_threshold=2). Accordingly, notifications and/or streaming may not be suppressed until the merged bounding box region has at least two unexpired historical bounding box detections. However, the frequency threshold may be modified (e.g., reduced) if a newly-detected bounding box has an exceedingly low confidence score. For example, the Freq_threshold may be set to 1 if a newly-detected bounding box associated with a region has a confidence score <30%.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A computer-implemented method comprising:
   receiving, from an object detector of a security system, first bounding box data indicating a detection of a first class of object in a first frame of image data captured by a camera of the security system;
   receiving, from the object detector, a first confidence score associated with the first bounding box data, the first confidence score indicating a confidence in the detection of the first class of object;
   determining a first threshold intersection-over-union (IoU) value associated with the first confidence score;
   determining second bounding box data indicating a past detection of the first class of object in a second frame of image data captured by the camera of the security system;
   determining an IoU value by comparing the first bounding box data to the second bounding box data;
   determining that the IoU value is less than the first threshold IoU value;
   determining a difference between a first center value of the first bounding box data and a second center value of the second bounding box data; and
   suppressing a notification associated with the detection of the first class of object in the first frame of image data based on the difference between the first center value and the second center value being less than a threshold distance.

2. The computer-implemented method of claim 1, further comprising:
   determining that the second bounding box data is associated with a first region of bounding boxes; and
   determining that the first region of bounding boxes is associated with greater than a threshold number of past detections, wherein the notification is suppressed further based on the first region of bounding boxes being associated with greater than a threshold number of past detections.

3. The computer-implemented method of claim 1, further comprising:
   determining a first region comprising the second bounding box data indicating the past detection of the first class of object in the second frame of image data;
   generating first time to live (TTL) data associated with the first region, the first TTL data indicating a first expiration time; and
   generating second TTL data associated with the first region, wherein the second TTL data extends the first expiration time to a second expiration time, and wherein the second TTL data is generated based on at least one of the IoU value or the difference between the first center value and the second center value.

4. A method comprising:
   receiving first image data representing a first image;
   determining, based on the first image data and using a machine learning model, first bounding area data indicating a first bounding area corresponding to an object detection for the first image;

accessing stored false positive bounding area data indicating a false positive bounding area determined based on one or more previous object detections for one or more previous images;

determining, based on the first bounding area data and the false positive bounding area data, an intersection over union value;

determining, based on the first bounding area data and the false positive bounding area data, a center distance value indicating a distance between a center of the first bounding area and a center of the false positive bounding area;

determining, based on the intersection over union value and the center distance value, whether to send an alert to a user device.

5. The method of claim 4, wherein the method comprises comparing the intersection over union value to a threshold, and wherein the determining whether to send an alert to a user device is based on the comparing of the intersection over union value to the threshold.

6. The method of claim 4, wherein the method comprises
determining a confidence value associated with the first bounding area data;
determining a first threshold based on the confidence value; and
comparing the intersection over union value to the first threshold;
wherein the determining whether to send an alert to a user device is based on the comparing of the intersection over union value to the first threshold.

7. The method of claim 4, wherein the machine learning model comprises a convolutional neural network.

8. The method of claim 4, wherein the machine learning model comprises a visual transformer.

9. The method of claim 4, wherein the stored false positive bounding area data indicates a false positive bounding area determined based on a plurality of previous object detections for a plurality of previous images.

10. The method of claim 4, wherein the method comprises:
determining, based on the center distance value and using a probability model, a similarity value;
wherein the determining whether to send an alert to a user device is based on the similarity value.

11. The method of claim 4, wherein the method comprises:
determining, based on the first bounding area data, a first aspect ratio;
determining, based on the false positive bounding area data, a second aspect ratio;
determining, using a probability model, a similarity value based on the center distance value, the first aspect ratio, and the second aspect ratio;
wherein the determining whether to send an alert to a user device is based on the similarity value.

12. The method of claim 4, wherein the method comprises:
determining a confidence value associated with the first bounding area data; and
comparing the confidence value to a threshold;
wherein the determining of the center distance value is based on the comparing of the confidence value to the threshold.

13. The method of claim 4, wherein the method comprises:
determining, based on the intersection over union value, a visual similarity value; and determining, based on the center distance value, a geometric similarity value;
wherein the determining whether to send an alert to a user device is based on the visual similarity value and the geometric similarity value.

14. The method of claim 4, wherein the method comprises:
determining, based on the intersection over union value, a visual similarity value; and
determining, based on the center distance value, a geometric similarity value;
determining an overall similarity value based on the visual similarity value, a first weight associated with the visual similarity value, the geometric similarity value, and a second weight associated with the geometric similarity value;
wherein the determining whether to send an alert to a user device is based on the overall similarity value.

15. The method of claim 4, wherein the method comprises:
determining, based on the center distance value, a geometric similarity value;
determining an overall similarity value based on the intersection over union value, a first weight associated with the intersection over union value, the geometric similarity value, and a second weight associated with the geometric similarity value;
wherein the determining whether to send an alert to a user device is based on the overall similarity value.

16. The method of claim 4, wherein the method comprises:
based on the intersection over union value and the center distance value, updating the stored false positive bounding area data using the first bounding area data.

17. The method of claim 4, wherein the method comprises:
based on the intersection over union value and the center distance value, updating the stored false positive bounding area data using the first bounding area data;
receiving second image data representing a second image;
determining, based on the second image data and using a machine learning model, second bounding area data indicating a second bounding area corresponding to a second object detection for the second image;
determining, based on the second bounding area data and the false positive bounding area data, a second intersection over union value;
determining, based on the second bounding area data and the false positive bounding area data, a second center distance value indicating a distance between a center of the second bounding area and a center of the false positive bounding area; and
based on the second intersection over union value and the second center distance value, determining whether to send an alert to a user device.

18. The method of claim 4, wherein the method comprises:
based on the intersection over union value and the center distance value,
updating the stored false positive bounding area data using the first bounding area data, and
updating an expiration time value associated with the false positive bounding area data.

19. A method comprising:
receiving first image data representing a first image;
determining, based on the first image data and using a machine learning model, first bounding area data indicating a first bounding area corresponding to a first object detection for the first image;

accessing stored false positive bounding area data indicating a false positive bounding area determined based on one or more previous object detections for one or more previous images;

determining, based on the first bounding area data and the false positive bounding area data, an intersection over union value;

determining, based on the first bounding area data and the false positive bounding area data, a center distance value indicating a distance between a center of the first bounding area and a center of the false positive bounding area; and based on the intersection over union value and the center distance value, updating the stored false positive bounding area data using the first bounding area data.

20. The method of claim 19, wherein the method comprises:

based on the intersection over union value and the center distance value, updating an expiration time value associated with the false positive bounding area data.

21. The method of claim 19, wherein the method comprises comparing the intersection over union value to a threshold, and wherein the updating of the stored false positive bounding area data is based on the comparing of the intersection over union value to the threshold.

22. The method of claim 19, wherein the method comprises determining a confidence value associated with the first bounding area data;

determining a first threshold based on the confidence value; and comparing the intersection over union value to the first threshold;

wherein the updating of the stored false positive bounding area data is based on the comparing of the intersection over union value to the first threshold.

23. The method of claim 19, wherein the method comprises:

receiving second image data representing a second image;

determining, based on the second image data and using a machine learning model, second bounding area data indicating a second bounding area corresponding to a second object detection for the second image;

determining, based on the second bounding area data and the false positive bounding area data, a second intersection over union value;

determining, based on the second bounding area data and the false positive bounding area data, a second center distance value indicating a distance between a center of the second bounding area and a center of the false positive bounding area; and based on the second intersection over union value and the second center distance value, determining whether to send an alert to a user device.

24. The method of claim 19, wherein the method comprises:

determining, based on the center distance value, a geometric similarity value;

determining an overall similarity value based on the intersection over union value, a first weight associated with the intersection over union value, the geometric similarity value, and a second weight associated with the geometric similarity value;

wherein the updating of the stored false positive bounding area data is based on the overall similarity value.

* * * * *